United States Patent
Kwon et al.

(10) Patent No.: US 12,101,288 B2
(45) Date of Patent: Sep. 24, 2024

(54) METHOD AND APPARATUS FOR PROVIDING EMAIL SERVICE

(71) Applicant: KAKAO CORP., Jeju-si (KR)

(72) Inventors: Ji Yeong Kwon, Seongnam-si (KR); Hyuk Jung Jang, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 0 days.

(21) Appl. No.: 17/172,260

(22) Filed: Feb. 10, 2021

(65) Prior Publication Data

US 2021/0250318 A1  Aug. 12, 2021

(30) Foreign Application Priority Data

Feb. 10, 2020 (KR) .................. 10-2020-0015910

(51) Int. Cl.
*H04L 51/42* (2022.01)
*H04L 51/04* (2022.01)
*H04L 51/226* (2022.01)

(52) U.S. Cl.
CPC .............. *H04L 51/42* (2022.05); *H04L 51/04* (2013.01); *H04L 51/226* (2022.05)

(58) Field of Classification Search
CPC ......... H04L 51/22; H04L 51/04; H04L 51/42; H04L 51/26
See application file for complete search history.

(56) References Cited

U.S. PATENT DOCUMENTS

| | | | | |
|---|---|---|---|---|
| 8,635,285 B2* | 1/2014 | D'Amato | ................ | G06F 16/93 709/206 |
| 10,432,568 B2* | 10/2019 | Quintero | ................ | G06Q 10/06 |
| 2008/0126951 A1* | 5/2008 | Sood | ..................... | H04L 51/226 715/752 |
| 2009/0164588 A1* | 6/2009 | D'Amato | ................ | G06F 16/93 709/206 |
| 2010/0250693 A1* | 9/2010 | Zheng | ..................... | G06Q 10/10 709/206 |
| 2012/0246725 A1* | 9/2012 | Osipkov | ................. | H04L 51/12 726/23 |
| 2012/0254325 A1* | 10/2012 | Majeti | ..................... | H04L 51/18 709/206 |
| 2012/0260193 A1* | 10/2012 | Ahiakpor | ............. | G06Q 10/107 715/752 |
| 2014/0143683 A1* | 5/2014 | Underwood, IV | .... | G06F 3/0482 715/752 |
| 2017/0331777 A1* | 11/2017 | Brisebois | ................ | H04L 51/16 |

FOREIGN PATENT DOCUMENTS

| | | |
|---|---|---|
| JP | 2003-216551 A | 7/2003 |
| KR | 10-2001-0109508 A | 12/2001 |
| KR | 10-2008-0018393 A | 2/2008 |

\* cited by examiner

*Primary Examiner* — Cheikh T Ndiaye
(74) *Attorney, Agent, or Firm* — CANTOR COLBURN LLP (57) ABSTRACT

A method and apparatus for providing an email service is provided. The method includes sorting received emails into preset categories, providing an interface for reading an email for each category, and determining whether to delete an email based on an automatic deletion option set for each category.

17 Claims, 8 Drawing Sheets

METHOD AND APPARATUS FOR PROVIDING EMAIL SERVICE

CROSS-REFERENCE TO RELATED APPLICATIONS

This application claims the benefit under 35 USC § 119(a) of Korean Patent Application No. 10-2020-0015910 filed on Feb. 10, 2020, in the Korean Intellectual Property Office, the entire disclosure of which is incorporated herein by reference for all purposes.

BACKGROUND

1. Field

The following description relates to a method and apparatus for providing an email service.

2 Description of Related Art

An email is a widely used means of transmitting and receiving a massive amount of information without requiring any cost for communication. It allows people to connect to anywhere through the Internet, enabling accurate and rapid communication therebetween.

The technological development of portable terminals (e.g., smartphones and personal digital assistants (PDAs)) for mobile communication has allowed people to transmit and receive emails anytime and anywhere while on the move. Email users can thus transmit and receive tens or hundreds of emails a day. Meanwhile, email users receive emails of different importance. For instance, they receive work-related emails of greater importance than newsletters or advertising emails.

However, an existing email service may not classify separately such important emails, and a user may thus need to explore all emails and delete unwanted emails one by one manually to select wanted emails from all the emails. However, this may compromise the convenience a user may experience otherwise, considering the great number of emails a user receives a day.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect provides a method that sorts received emails into predefined categories.

Another aspect provides a method that automatically deletes emails that are not read for a preset period of time after being sorted.

Another aspect provides a method that sets an automatic deletion option for each category.

Another aspect provides a method that provides an email service through an instant messaging service (IMS) connected to the email service.

Another aspect provides a method that provides a reminder of an email that satisfies a preset condition among unread emails.

According to an example embodiment, there is provided a method of providing an email service, the method including sorting received emails into preset categories, providing an interface for reading an email by each category, and determining whether to delete an email based on an automatic deletion option set for each category.

The method may further include verifying whether an email is read or not. The determining of whether to delete the email may include determining whether to delete the email based on whether the email is read or not.

The determining of whether to delete the email may include determining whether the email satisfies an automatic deletion allowance condition on the allowance of automatic deletion set for each category.

The determining of whether to delete the email may include determining whether to delete the email based on a period condition set for each category. The period condition may be on whether a time at which the email is received is before a preset time.

The determining of whether to delete the email based on the period condition may include determining the period condition based on time information included in a title or a text of the email.

The method may further include providing an interface for changing the automatic deletion option for each category.

An initial value of the automatic deletion option may be set differently for each category.

The method may further include identifying a first account of an instant messaging service (IMS) connected to an account of the email service, and providing at least a portion of a service provided by the email service through the IMS based on the identified first account.

The method may further include identifying a second account having an account connected to the email service from among other accounts of the IMS that have a preset relationship with the first account. The sorting may include sorting, into one category, an email received from the account of the email service connected to the second account among the emails.

The providing may include providing a notification of the receipt of an email through the IMS by each category.

The method may further include providing a preset format, and providing an interface that displays, in a preset form, an email written based on the preset format among unread emails.

The method may further include analyzing a content included in an unread email sorted into a preset category among the categories, extracting an email that satisfies a preset standard based on a result of the analyzing, and providing an interface that displays the extracted email in a preset form.

According to another example embodiment, there is provided an apparatus for providing an email service, the apparatus including a processor configured to sort received emails into preset categories, provide an interface for reading an email by each category, and determine whether to delete an email based on an automatic deletion option set for each category.

The processor may determine whether to delete an email based on whether the email is read or not.

The processor may determine whether the email satisfies an automatic deletion allowance condition on the allowance of automatic deletion set for each category.

The processor may determine whether to delete the email based on a period condition set for each category. The period condition may be on whether a time at which the email is received is before a preset time.

The processor may determine the period condition based on time information included in a title or a text of the email.

The processor may provide an interface for changing the automatic deletion option for each category.

The processor may identify a first account of an IMS connected to an account of the email service, and provide at least a portion of a service provided by the email service through the IMS based on the identified first account.

The processor may identify a second account having an account connected to the email service from among other accounts of the IMS that have a preset relationship with the first account, and sort, into one category, an email received from the account of the email service connected to the second account among the emails.

The processor may provide a notification of the receipt of an email through the IMS by each category.

The processor may provide a preset format, and provide an interface that displays, in a preset form, an email written based on the preset format among unread emails.

The processor may analyze a content included in an unread email sorted into a preset category among the categories, extract an email that satisfies a preset standard based on a result of the analyzing, and provide an interface that displays the extracted email in a preset form.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout this disclosure, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

The following example embodiments may be embodied in various forms of products, for example, a personal computer (PC), a laptop computer, a tablet PC, a smartphone, a television (TV), a smart home appliance, an intelligent vehicle, a kiosk, and a wearable device. Hereinafter, examples will be described in detail with reference to the accompanying drawings, and like reference numerals in the drawings refer to like elements throughout.

Figure 1:
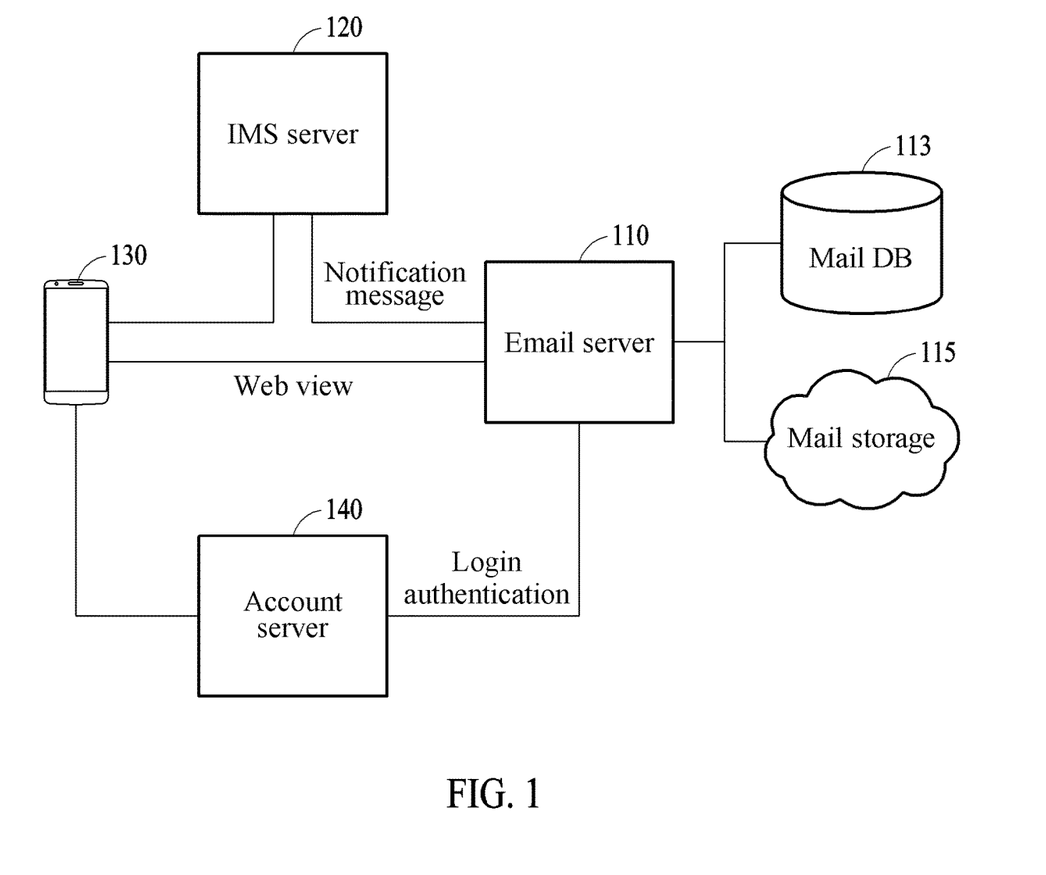
FIG. 1 illustrates an example of an email service system according to an example embodiment.

FIG. 1 illustrates an example of an email service system according to an example embodiment.

Referring to FIG. 1, an email service system includes an email server 110, an instant messaging service (IMS) server 120, a user terminal 130, and an account server 140. One or more blocks or a combination thereof illustrated in FIG. 1 may be embodied by a special purpose hardware-based computer that performs a certain function or a combination of special purpose hardware and computer instructions.

The IMS server 120 may function as a service platform that provides an IMS to users. The IMS may refer to a service that allows two or more users to communicate online with one another in real time using a network. The IMS may allow two or more users who install the same instant messenger to communicate online with one another in real time. The instant messenger may be embodied in a form of an application. A user may connect to the IMS server 120 through the user terminal 130 in which a messenger application is installed. The messenger application may include a computer, a database (DB), a module, a program, and the like that are run to perform various functions including, for example, a basic function of writing a text and transmitting the text, a function of transmitting multimedia contents (e.g., voice, video images, etc.), a message notification function, a schedule or calendar function, and the like.

The user terminal 130 may include any type of user devices that install and execute the messenger application associated with the IMS server 120, and be one of electronic devices such as, for example, a PC, a ultra-mobile PC (UMPC), a workstation, a net-book, a personal digital assistant (PDA), a portable computer, a web tablet, a wireless phone, a mobile phone, a smartphone, an e-book, a portable multimedia player (PMP), a portable game console, a navigation device, a black box, a digital camera, and the like. The user terminal 130 may perform an overall service operation such as, for example, configuring a service screen, inputting data, transmitting and receiving data, storing data, and the like, under the control of the messenger application.

The email server 110 may function as a service platform that provides emails to users. The email server 110 may refer to a server that receives an email from a user terminal and transmits a received email to a recipient of the email. As illustrated, the email server 110 may be connected to the IMS server 120, the user terminal 130, the account server 140, a mail DB 113, and a mail storage 115 through a network (not shown). The network may include, for example, the Internet, one or more local area networks (LANs), wide area networks (WANs), cellular networks, mobile networks, and other types of networks, or combinations of these networks. The account server 140 may refer to a server that manages user account information and performs login. An account described herein may refer to an email address.

Although the email server 110, the mail DB 113, and the mail storage 115 are illustrated as being separate components in FIG. 1 for the convenience of description, examples are not limited thereto. For another example, the mail DB 113 and the mail storage 115 may be one component of the email server 110.

According to an example embodiment, the email server 110 that provides an email service may provide at least a portion of a service provided by the email service through the IMS based on an account of the IMS that is connected to or interworked with an account of the email service. The email server 110 receiving an email may provide a notification of the arrival of the email through the IMS based on an identified account of the IMS. The email service may be configured in an in-app form of the messenger application to operate on the messenger application. For example, the email server 110 may provide the email service through the messenger application installed in the user terminal 130.

Although the email service is described herein as being connected to or interworked with the IMS and configured to operate on the messenger application, the email service may be provided separately from the IMS depending on examples. In such a case, the email server 110 may provide the email service through an email application, and the user terminal 130 may perform an overall operation of the email service including, for example, configuring a service screen, inputting data, transmitting and receiving data, storing data, and the like, under the control of the email application.

Although to be described in detail hereinafter, the email server 110 may sort received emails by predefined categories, and automatically delete an email that is not read for a preset period of time although being sorted. In addition, the email server 110 may set an automatic deletion option for each category, and provide a reminder of an email that satisfies a preset condition among unread emails.

Figure 2:
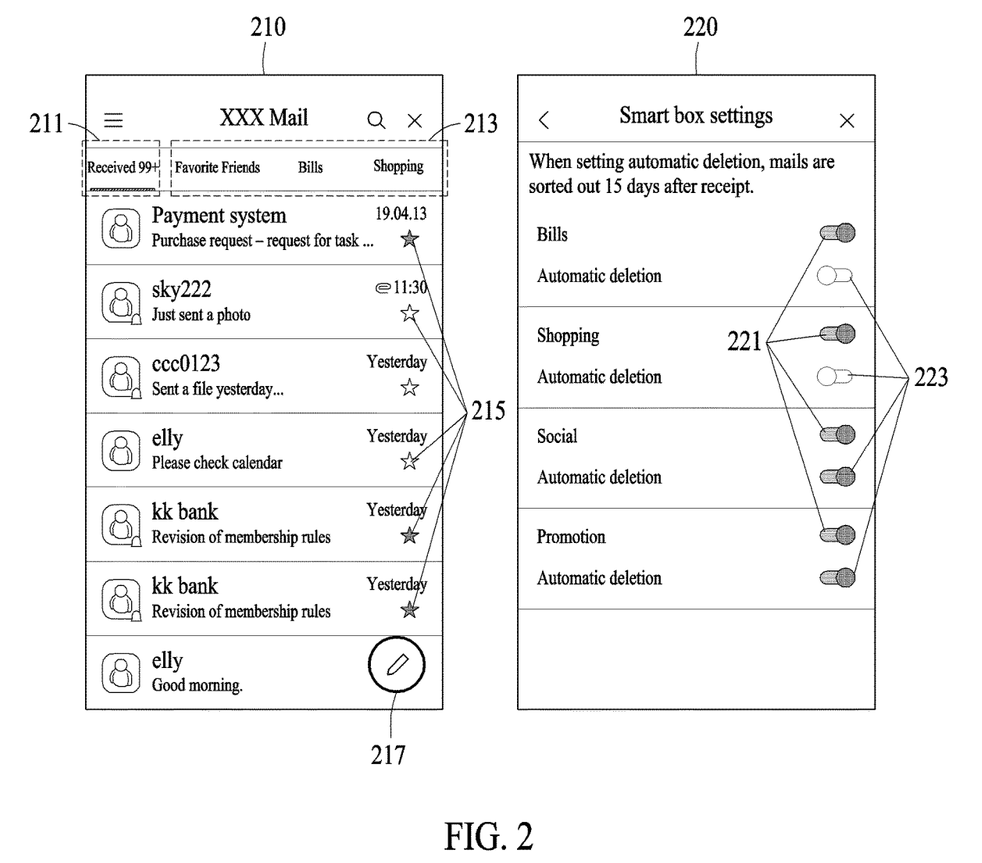
FIG. 2 illustrates an example of sorting and controlling emails by category according to an example embodiment.

FIG. 2 illustrates an example of sorting and controlling emails by category according to an example embodiment.

Referring to FIG. 2, an email server may sort received emails into preset categories. The email server described hereinafter may be the email server 110 described above with reference to FIG. 1. The email server may provide the categories such as, for example, a favorite friend category, a bills category, a shopping category, a social category, and a promotion category.

The email server may set a rule using an account or a title of a received email, and sort the received email by category according to the set rule. For example, the email server may sort an email received from an account of a shopping mall into the shopping category and an email including "bill" in its title into the bills category. For another example, the email server may sort an email including a keyword, for example, "payment," "purchase," and "delivery information," in its title into the shopping category, an email including a keyword associated with "advertisement" or "promotion" in its email into the promotion category, and an email received from an Internet cafe or an SNS account into the social category.

In a case in which an email belongs to a plurality of categories, the email server may sort the email according to the set rule. For example, when the email server receives an email including a keyword associated with "advertisement" in its title from an online cafe account, the email server may sort the email into the social category. For example, when the email server receives an email including a keyword associated with "bill" and "advertisement" in its title, the email server may sort the email into the promotion category.

For another example, when the email server receives a forwarded email including a keyword associated with "advertisement" in its title, the email server may sort the email as a general mail without sorting the email into the promotion category. In this example, when the email includes a keyword associated with "advertisement" along with "Fw" or "Re" in its title, the email server may sort the email as the general mail without sorting the email into the promotion category.

Alternatively, in a case in which an email belongs to a plurality of categories through labeling, the email server may include the email in all the categories. A method of sorting emails by category is not limited to the foregoing examples, and other methods may also be performed.

The email server may provide an interface for reading an email by each category. For example, the email server may provide a graphics user interface (GUI) for reading an email by each category through an application of a user terminal. By referring to a main-view screen 210 provided through the application, the email server may provide the number of unread emails in a received mail box (or an inbox tab 211 herein), and provide a list of all received emails in response to an input of selecting the inbox tab 211 from a user. Such an email list may include information including, for example, a sender's profile image, a sender account, a title, an attached file, a sent time, and a received time of each email. In addition, the user may mark a wanted mail through an important mail indicating interface 215.

Also, the email server may provide a category tab 213 in addition to the inbox tab 211, and provide a list of emails sorted into a corresponding category in response to an input of selecting a certain category included in the category tab 213 from the user. For example, when the user selects a bills tab in the category tab 213, the user may verify a list of emails sorted into a bills category. Such an email list may be provided in the same form as the email list provided in the inbox tab 211. Although not illustrated, the email server may provide the number of unread emails by each category of the category tab 213. The order of tabs included in the category tab 213 may change. Hereinafter, a mailbox classified by category will also be referred to as a smart box.

The email server may provide an email writing interface 217. The email server may provide an interface for writing an email in response to an input of selecting the email writing interface 217 from the user.

The email server may determine whether to delete an email based on an automatic deletion option set for each category. Referring to a smart box settings screen 220, the email server may provide an interface 223 for selecting whether to allow automatic deletion for an email by each category. In addition, the email server may provide an interface 221 for selecting a category to be indicated in the category tab 213. For example, the user may enter an input to the interface 221 to use a wanted category as a smart box. In this example, the email server may move only a newly received email to the smart box without affecting previous emails, or move the previous emails altogether to the smart box at once.

For another example, the user may enter an input to the interface 221 not to use a wanted category as the smart box. In this example, the email server may receive only emails that are received afterward into a general inbox, while retaining emails previously sorted into a corresponding category.

Although not illustrated, the email server may change the order of smart boxes exhibited in the category tab 213 in response to an input from the user. In addition, the email server may automatically change the order of the smart boxes according to a set rule. For example, the email server may automatically change the order of the smart boxes based on the rule, for example, a rule of arranging ahead a smart box having a greater total number of emails, a rule of arranging ahead a smart box having a greater number of unread emails, a rule of arranging ahead a smart box with faster automatic deletion, a rule of arranging first an email received from a favorite friend, or the like. A favorite friend described herein may refer to a friend of interest.

For a category that allows automatic deletion, the email server may move an email in the category to a trash box when a preset period of time elapses. Although, on the smart box settings screen 220, a phrase that reads "automatic deletion: emails that have not been read for 7 days are moved to the trash box" may be shown, a period condition which is about whether a time at which an email is received is before a preset time or period may be set for each category. For example, for an email included in a promotion category, a period for automatic deletion may be adjusted based on a period of a related promotion. For an email included in a shopping category, the email may be moved to the trash box after a preset period of time (e.g., 7 days) elapses from a delivery completion date or an expected completion date included in a title or text of the email. For an email included in a bills category, the email may be moved to the trash box after a preset period of time (e.g., 7 days) elapses from a date on which an amount of money used is paid off according to user settings.

Depending on examples, the email server may automatically delete only unread emails. The email server or an email application may verify whether a user reads an email or not, and determine whether to delete an unread email based on the automatic deletion option set for each category. Depending on examples, the email server may automatically delete only an email the user already reads.

In a case in which an email belongs to a plurality of categories and is included in all the categories through labeling, whether to automatically delete the email may be determined based on settings of each category by deleting a label.

In addition, an initial value of the automatic deletion option may be set differently for each category. The initial value of the automatic deletion option may be set as a default before the user sets the automatic deletion option. For example, for the bill category, the automatic deletion option may have an initial value that does not allow automatic deletion. For the promotion category, the automatic deletion option may have an initial value that allows automatic deletion, and the user may select a period (e.g., 7, 10, and 15 days) corresponding to the period condition for the automatic deletion.

Figure 3:
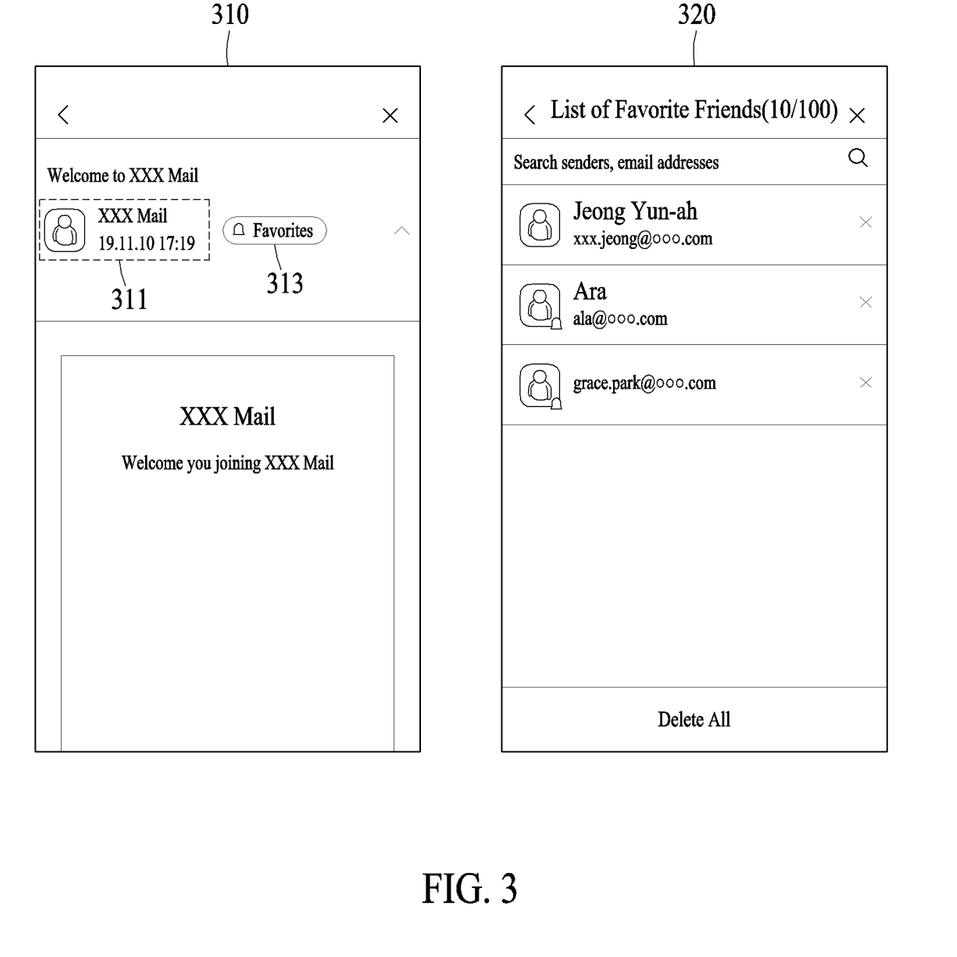
FIG. 3 illustrates an example of a favorite friend function according to an example embodiment.

FIG. 3 illustrates an example of a favorite friend function according to an example embodiment.

Referring to FIG. 3, an email server may provide a favorite friend function. The email server may sort, into a category, an email received from an account set as a favorite friend by a user, and separately provide emails received only from favorite friends. Here, the term "favorite" or "favorite friend" used herein may refer to a friend of interest. In addition, the email server may separately mark and provide emails received from favorite friends.

Referring to an email read screen 310 provided through an application, the email server may provide an interface 311 that displays information including, for example, a profile of a sender account, a sent time, a received time, and the like. In addition, the email server may allow the user to set a sender account of an email as a favorite or cancel the favorite in response to an input of selecting a favorite setting/canceling interface 313 from the user. Depending on examples, the user may set, as a favorite, an account in a list of addresses, a list of received emails, or a list of favorites, or cancel the favorite.

Referring to a favorite friend list screen 320 provided through the application, the email server may provide a list of accounts set as favorites. The list may include information including, for example, each account and a profile of each account. Further, the email server may provide information associated with a messaging service account connected to or interworked with the email service, in addition to information associated with an email account.

Figure 4:
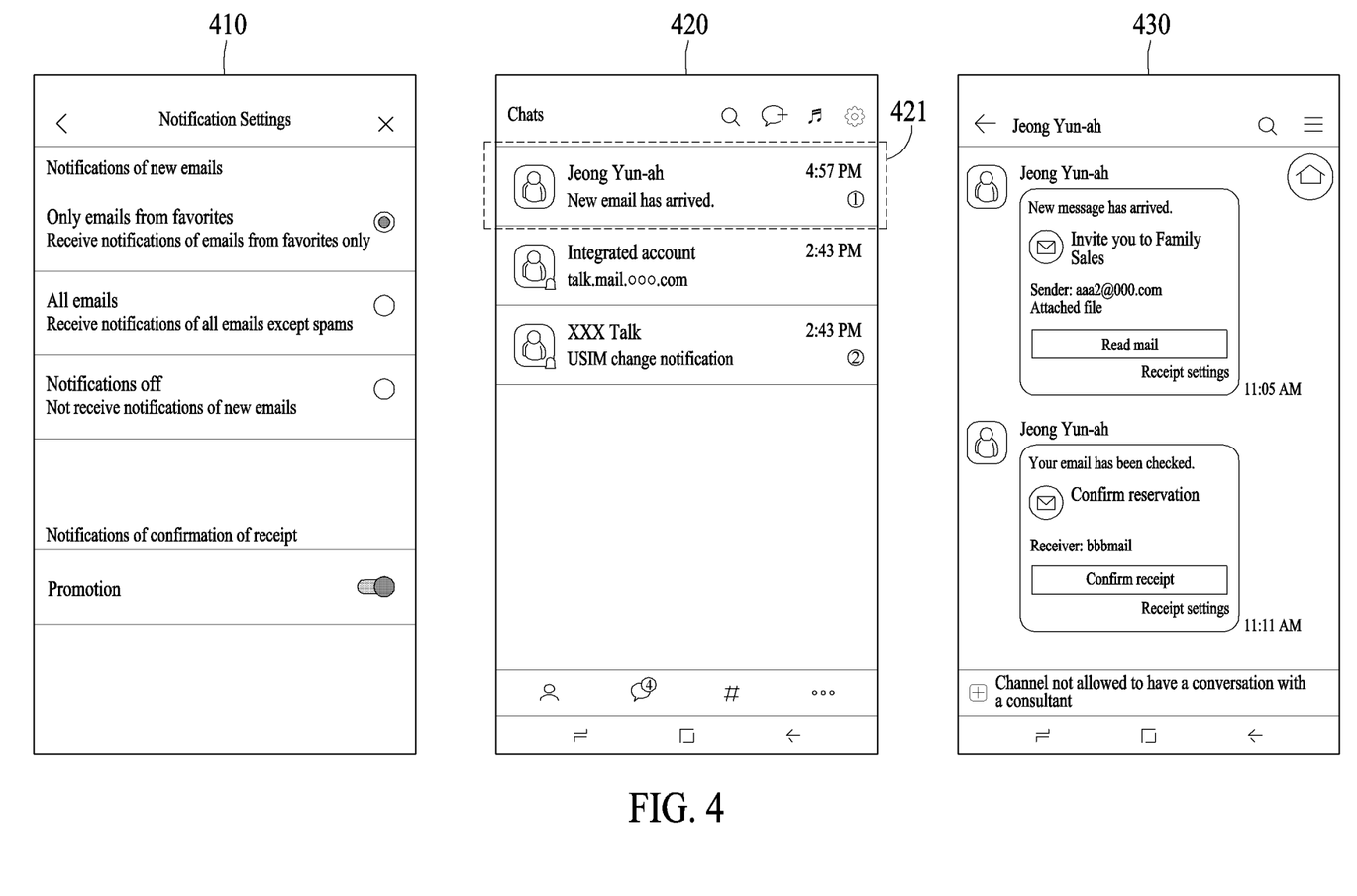
FIG. 4 illustrates an example of providing a notification of the arrival of an email received from a favorite friend according to an example embodiment.

FIG. 4 illustrates an example of providing a notification of the arrival of an email received from a favorite friend according to an example embodiment.

Referring to FIG. 4, an email server may provide a notification of the arrival of a received email. However, when a notification is provided in response to the arrival of all emails, there may be too many notifications, causing inconvenience to a user. Thus, the email server may provide a notification of the arrival of only an email received from a favorite friend.

Referring to a notification settings screen 410 provided through an application, the email server may provide a notification of the arrival of only an email received from a favorite friend in response to an input of selecting an interface for providing a notification of the arrival of an email received from a favorite friend from the user.

In addition, the email server may provide a notification of the arrival of an email received from a favorite friend through an IMS. For example, the user may verify or confirm a notification of the arrival of an email received from a favorite friend through a messenger application of the IMS. The email server may request an IMS server for a notification of the arrival of a received email, and the IMS server may provide the notification of the arrival of the received email through the messenger application. The IMS server may be the IMS server 120 described above with reference to FIG. 1.

Referring to a chats screen 420 provided through the messenger application, the user may receive a notification of the arrival of an email received from a favorite friend, for example, Jeong Yun-ah, through a notification interface 421 of the messenger application. The notification interface 421 may be provided for each favorite friend. When the user selects the notification interface 421, the chats screen 420 may be switched to a screen 430 from which the user may verify the email received from the favorite friend. Referring to the screen 430, when the user selects an interface (e.g., "read mail" on the screen 430) for verifying the received email, the screen 430 may be switched to a screen for reading the email. When the user selects "reply" on the screen 430, the screen 430 may be switched to a screen for responding to the email.

Figure 5:
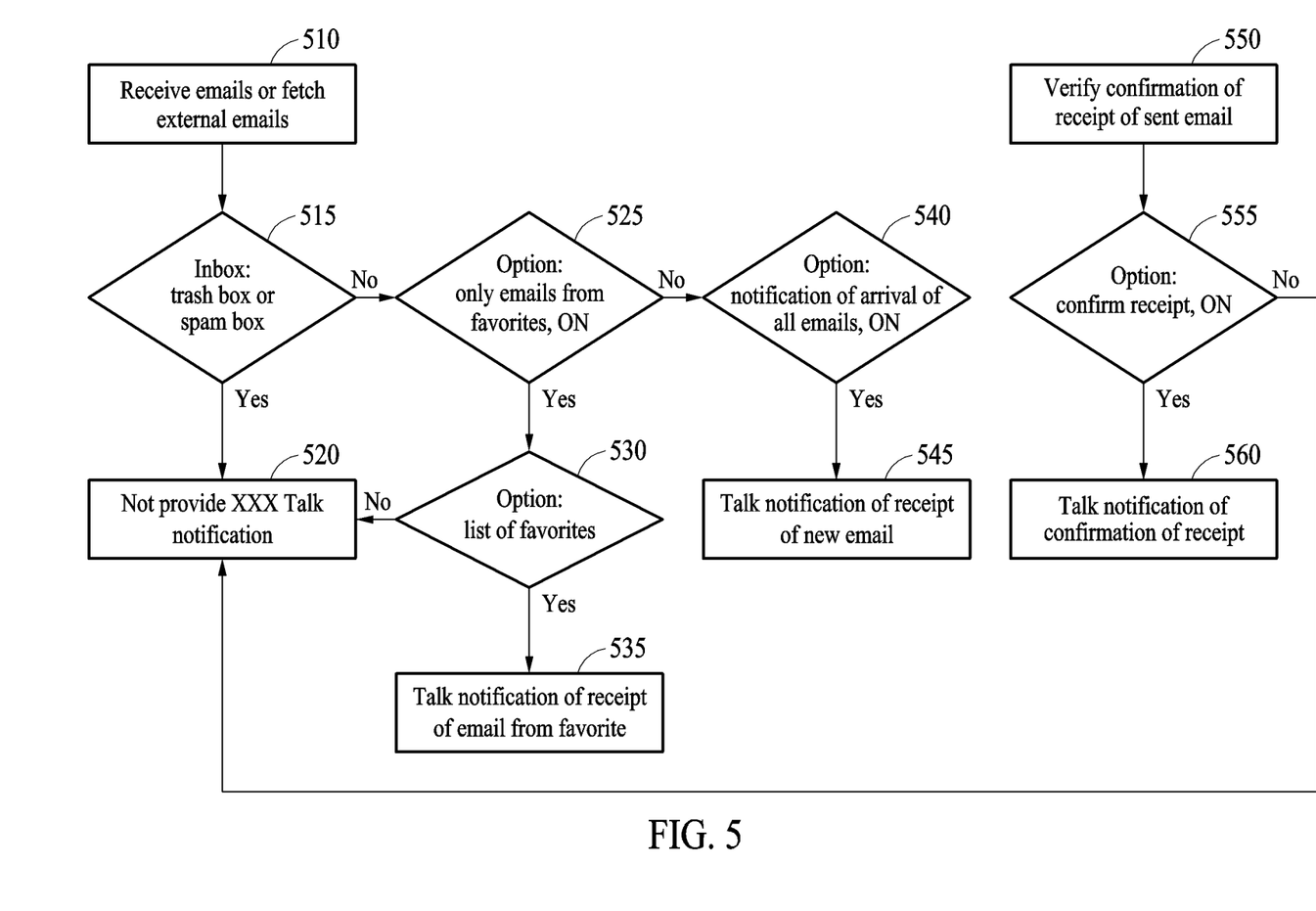
FIG. 5 illustrates a flowchart of an example of providing a notification of the arrival of an email through an instant messaging service (IMS) according to an example embodiment.

FIG. 5 illustrates a flowchart of an example of providing a notification of the arrival of an email through an IMS according to an example embodiment.

Operations 510 through 560 to be described hereinafter with reference to FIG. 5 may be performed by an email service system described above with reference to FIG. 1. The operations 510 through 560 may be performed in an illustrated order, but the order may be partially changeable and some of the operations 510 through 560 may be omitted without departing from the idea of the example embodiments described herein and the scope of the present disclosure. Most of the operations 510 through 560 may be performed in parallel or concurrently.

Referring to FIG. 5, in operation 510, the email service system receives emails or fetches external emails. In operation 515, the email service system determines whether a received email is sorted into a trash box or a spam box. In operation 520, when the received email is sorted into the trash box or the spam box, the email service server does not provide a notification of the arrival of an email.

In operation 525, the email service system determines whether to set to provide a notification of the arrival of emails only from favorite friends. In operation 530, when it is set to provide the notification of the arrival of emails only from favorite friends, the email service system determines whether a received email is an email received from a favorite friend. In operation 535, when the received email is an email received from a favorite friend, the email service system provides a notification of the arrival of the email through an IMS.

In operation 540, the email service system determines whether to set to provide a notification of the arrival of all emails. In operation 545, when it is set to provide the notification of the arrival of all emails, the email service system provides the notification of the arrival of an email through the IMS.

In addition, when a counterpart receives an email sent by a user, the email service system may provide a notification of confirmation of receipt of the email. In operation 550, the email service system verifies whether the counterpart receives the email after the email is sent. In operation 555, the email service system determines whether to set to provide the notification of the confirmation of the receipt. In operation 560, when it is set to provide the notification of the confirmation of the receipt, the email service system provides the notification of the confirmation of the receipt through the IMS.

Figure 6:
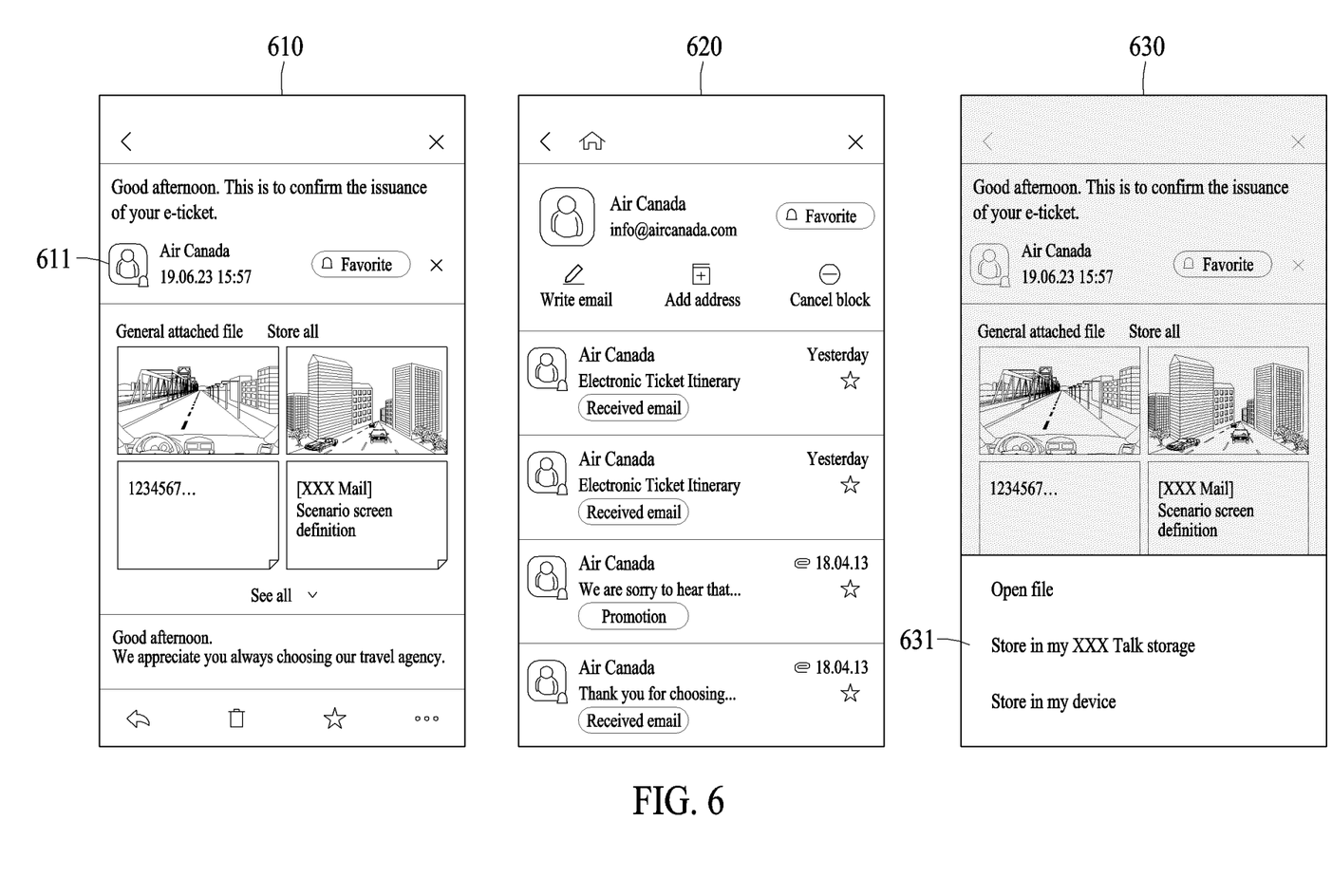
FIG. 6 illustrates an example of a profile screen according to an example embodiment.

FIG. 6 illustrates an example of a profile screen according to an example embodiment.

Referring to FIG. 6, an email server may provide an account and a list of sent and received emails.

Referring to an email read screen 610 provided through an application, the email server may provide an interface 611 that displays information including, for example, a profile of a sender account, a sent time, a received time, and the like. The email server may provide a profile screen 620 in response to an input of selecting the interface 611 from a user.

Referring to the profile screen 620 provided through the application, the email server may provide a corresponding account and a list of sent and received emails. In addition, the email server may further provide, for example, a profile of a sender account, a favorite friend set/cancel interface, an email write interface, an address add interface, and a receipt block/allow interface.

Referring to an attached file storing screen 630 provided through the application, the email server may provide an interface 631 for selecting a location at which an attached file included in a received email is to be stored. For example, the user may store the attached file in a user terminal, or in a storage of an IMS connected to an email service.

Figure 7:
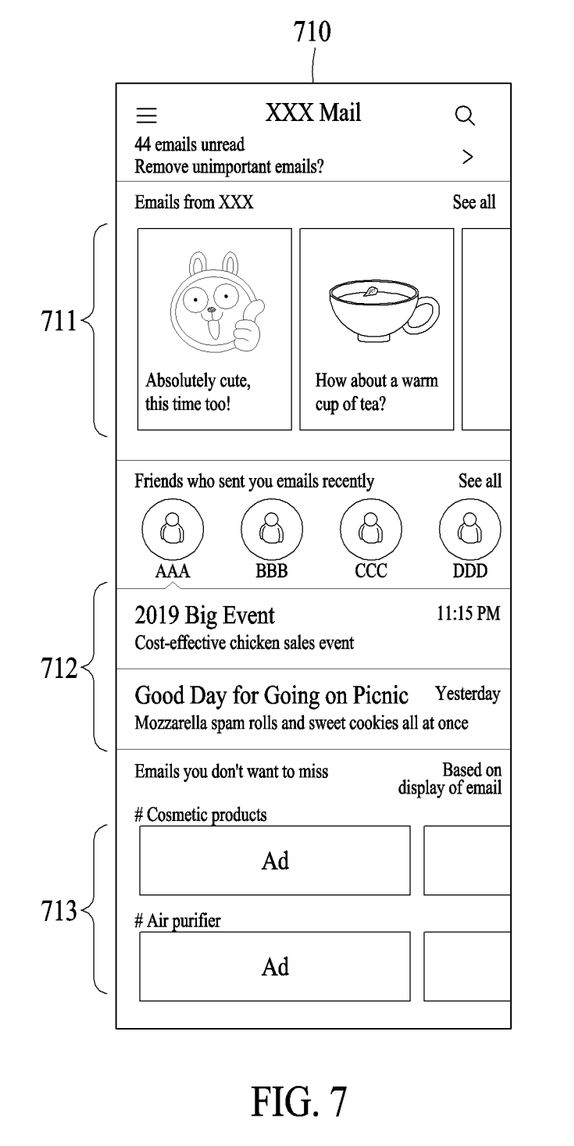
FIG. 7 illustrates an example of providing a reminder of an email that satisfies a condition according to an example embodiment.

FIG. 7 illustrates an example of providing a reminder of an email that satisfies a condition according to an example embodiment.

Referring to FIG. 7, an email server may provide a reminder of an email that satisfies a preset condition among unread emails. The email server may provide a preset format, and provide an interface that displays, in a preset form, an email written based on the preset format among unread emails.

For example, referring to a reminder providing screen 710 provided through an application, the email server may provide an interface 711 that displays, in a form of a card including a representative image (e.g., a photo) and a keyword, an email written based on the preset format. In this example, the email server may provide a format for receiving the representative image and the keyword.

Alternatively, the email server may provide an interface 712 that displays an email written based on the preset format in a form including a title and a first line of a text of the email.

The email server may analyze contents included in unread emails sorted into a preset category among categories, extract an email that satisfies a preset standard based on a result of the analyzing, and provide an interface that displays the extracted email in a preset form. For example, the email server may analyze contents included in unread emails sorted into a shopping category, extract an email including information associated with a product set in advance as a product of interest based on a result of the analyzing, and provide an interface 713 that displays the extracted email in a form of an advertisement including the product and a price of the product. Alternatively, in a case in which an email is received a preset number of times or greater from a certain domain, the email server may extract the email, and provide the interface 713 that displays the extracted email in a form of an advertisement including a corresponding product and a price.

In addition, the email server may provide an interface that displays efficiently the history of emails in chronological order based on a date. In addition, the email server may provide an interface that displays, in sequential order, emails to be deleted in the nearest future among emails included in smart boxes based on a deletion option.

Figure 8:
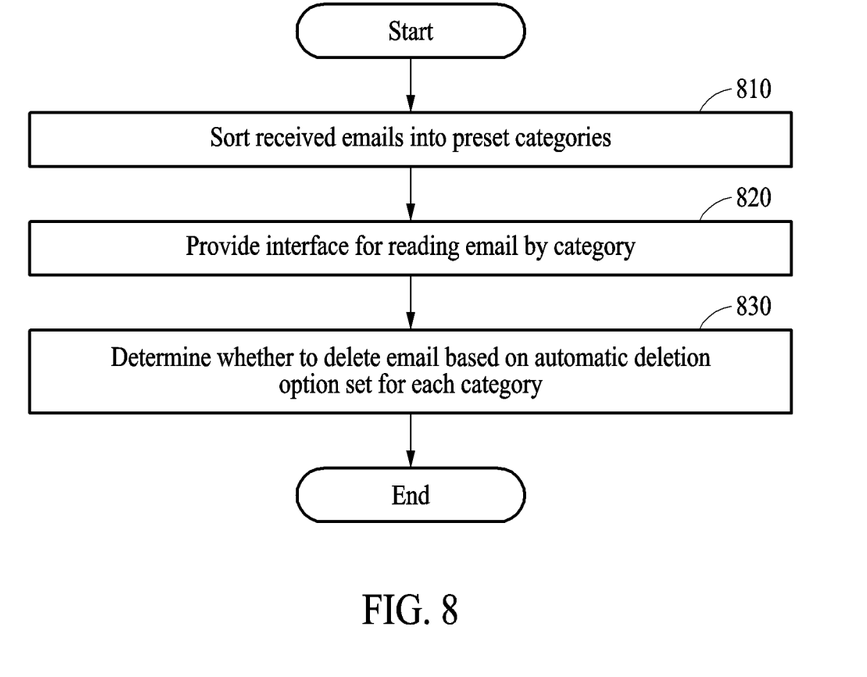
FIG. 8 illustrates a flowchart of an example of an email service providing method according to an example embodiment.

FIG. 8 illustrates a flowchart of an example of an email service providing method according to an example embodiment.

Operations 810 through 830 to be described hereinafter with reference to FIG. 8 may be performed by an email service providing apparatus described herein. The email service providing apparatus may be embodied by one or more hardware modules or software modules, or various combinations thereof. The email service providing apparatus may be the email server described above with reference to FIGS. 1 through 7.

Referring to FIG. 8, in operation 810, the email service providing apparatus sorts received emails into preset categories.

In operation 820, the email service providing apparatus provides an interface for reading an email by category.

In operation 830, the email service providing apparatus determines whether to delete an email based on an automatic deletion option set for each category. The email service providing apparatus may determine whether an email satisfies an automatic deletion allowance condition on the allowance of automatic deletion of the email, and determine whether the email satisfies a period condition on whether a time at which the email is received is before a preset time or period. The automatic deletion allowance condition and the period condition may be set for each category.

In addition, the email service providing apparatus may provide an interface for changing the automatic deletion option for each category.

The email service providing apparatus may identify a first account of an IMS connected to an email service, and provide at least a portion of a service provided by the email service through the IMS based on the identified first account.

The email service providing apparatus may identify a second account having an account connected to the email service among other accounts of the IMS that have a preset relationship with the first account. The email service providing apparatus may then sort, in to a category, an email received from an account of the email service connected to the second account among emails. For example, the email service providing apparatus may sort, into a category, emails received from accounts of friends in the IMS connected to the email service. Alternatively, the email service providing apparatus may sort, into a category, emails received from accounts of plus friends in the IMS connected to the email service. An account of a plus friend described herein may be a business account in the IMS that provides, in a form of a message of a messenger, contents such as business information, brand news, promotions, notices, real-time notices or notifications, events, discount coupons, and the like.

The email service providing apparatus may provide a notification of the receipt of an email by each category through the IMS. The email service providing apparatus may provide a preset format, and provide an interface that displays, in a preset form, an email written based on the preset format among unread emails.

According to an example embodiment described herein, it is possible to sort received emails into predefined categories.

According to an example embodiment described herein, it is possible to automatically delete emails that are not read for a preset period of time after being sorted.

According to an example embodiment described herein, it is possible to set an automatic deletion option for each category.

According to an example embodiment described herein, it is possible to provide an email service through an IMS connected to the email service.

According to an example embodiment described herein, it is possible to provide a reminder of an email that satisfies a preset condition among unread emails.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular: however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape: optical media such as CD-ROM discs, DVDs, and/or Blue-ray discs: magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of providing an email service, comprising:
   sorting received emails into preset categories;
   providing an interface for reading an email by each category;
   determining whether to delete an email based on an automatic deletion option is set for a category associated with an email and whether the email is read or not;
   responsive to determining that the automatic deletion option set for the category associated with the email is satisfied and that the email is unread, deleting only the unread email among all the received emails of the category; and
   providing an interface for changing the automatic deletion option for each category,
   wherein determining whether to delete the email comprises:
      identifying time information included in a title or a text of the email based on category information for each category; and
      determining a period condition for automatic deletion based on the time information.

2. The method of claim 1, wherein the determining of whether to delete the email comprises:
   determining whether the email satisfies an automatic deletion allowance condition on allowance of automatic deletion set for each category.

3. The method of claim 1, wherein the determining of whether to delete the email comprises:
   determining whether to delete the email based on the period condition set for each category,
   wherein the period condition is based on whether a time at which the email is received is before a preset time.

4. The method of claim 1, wherein an initial value of the automatic deletion option is set differently for each category.

5. The method of claim 1, further comprising:
   identifying a first account of an instant messaging service (IMS) connected to an account of the email service; and
   providing at least a portion of a service provided by the email service through the IMS based on the identified first account.

6. The method of claim 5, further comprising:
   identifying a second account having an account connected to the email service from among other accounts of the IMS that have a preset relationship with the first account,
   wherein the sorting comprises:
      sorting, into one category, an email received from the account of the email service connected to the second account among the emails.

7. The method of claim 5, wherein the providing comprises:
   providing a notification of receipt of an email through the IMS by each category.

8. The method of claim 1, further comprising:
   providing a preset format; and
   providing an interface that displays, in a preset form, an email written based on the preset format among unread emails.

9. The method of claim 1, further comprising:
   analyzing a content included in an unread email sorted into a preset category among the categories;
   extracting an email that satisfies a preset standard based on a result of the analyzing; and
   providing an interface that displays the extracted email in a preset form.

10. A non-transitory computer-readable storage medium storing instructions that, when executed by a processor, cause the processor to perform the method of claim 1.

11. The method of claim 1, wherein one of the preset categories is a bill category, wherein the determining of whether to delete the email comprises:
    determining whether to delete the email based on the period condition set for the bill category,
    wherein the period condition set for the bill category is based on whether a preset period of time has elapsed from a date on which an amount of money used is paid off.

12. An apparatus for providing an email service, comprising:
    a memory comprising computer readable instructions; and
    a processor for executing the computer readable instructions, the computer readable instructions controlling the processor to perform operations comprising:
       sorting received emails into preset categories,
       providing an interface for reading an email by each category, determining whether to delete an email based on the automatic deletion option is set for a category associated with an email and whether the email is read or not, responsive to determining that the automatic deletion option set for the category associated with the email is satisfied and that the email is unread, deleting only the unread email among all the received emails of the category, and providing an interface for changing the automatic deletion option for each category, wherein determining whether to delete an email comprises;

identifying time information included in a title or a text of the email based on category information for each category; and determining period condition for automatic deletion based on the time information.

13. The apparatus of claim 12, wherein the processor is configured to:

determine whether the email satisfies an automatic deletion allowance condition on allowance of automatic deletion set for each category.

14. The apparatus of claim 12, wherein the processor is configured to:

identify a first account of an instant messaging service (IMS) connected to an account of the email service; and provide at least a portion of a service provided by the email service through the IMS based on the identified first account.

15. The apparatus of claim 14, wherein the processor is configured to:

identify a second account having an account connected to the email service from among other accounts of the IMS that have a preset relationship with the first account; and sort, into one category, an email received from the account of the email service connected to the second account among the emails.

16. The apparatus of claim 14, wherein the processor is configured to:

provide a notification of receipt of an email through the IMS by each category.

17. The apparatus of claim 12, wherein the processor is configured to:

analyze a content included in an unread email sorted into a preset category among the categories;

extract an email that satisfies a preset standard based on a result of the analyzing; and provide an interface that displays the extracted email in a preset form.

\* \* \* \* \*